(No Model.)
J. S. NOWOTNY.
COMBINED ELECTRIC MOTOR AND INDUCTION COIL.
No. 509,445. Patented Nov. 28, 1893.
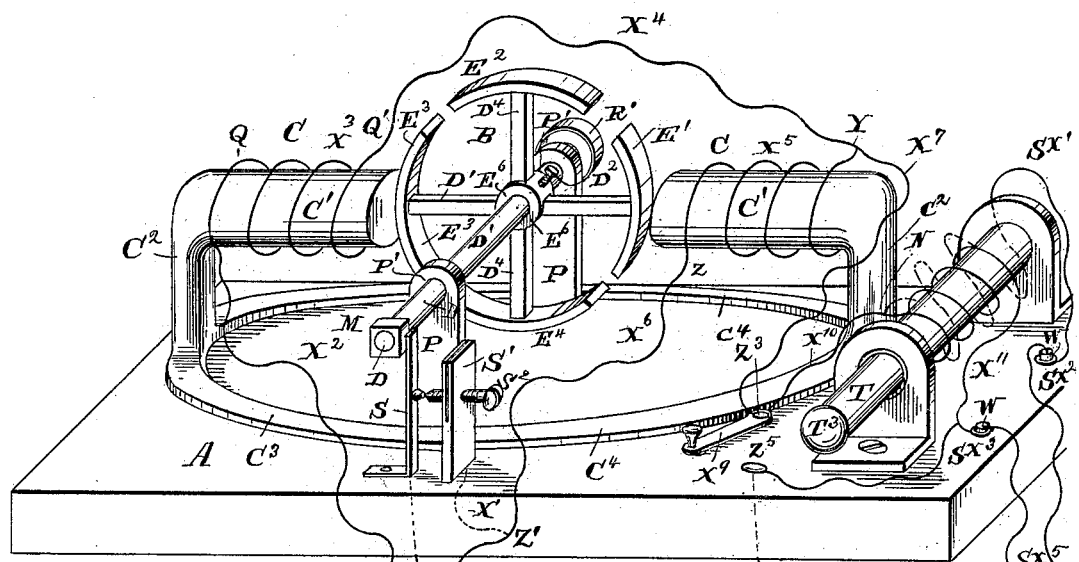
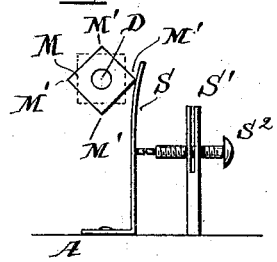
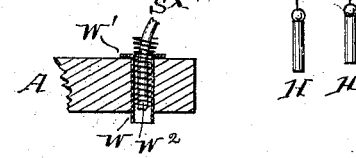
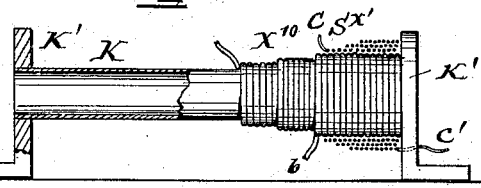
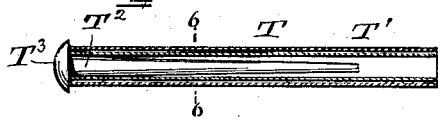
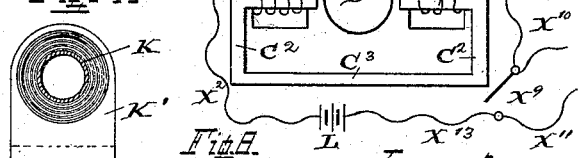
Attest
Wm. Hartley Pugh
K. Smith
Inventor
John S. Nowotny
THE NATIONAL LITHOGRAPHING COMPANY,
WASHINGTON, D. C.

UNITED STATES PATENT OFFICE.

JOHN S. NOWOTNY, OF CINCINNATI, OHIO.

COMBINED ELECTRIC MOTOR AND INDUCTION-COIL.

SPECIFICATION forming part of Letters Patent No. 509,445, dated November 28, 1893.

Application filed April 5, 1890. Serial No. 346,748. (No model.)

*To all whom it may concern:*

Be it known that I, JOHN S. NOWOTNY, a citizen of the United States of America, and a resident of the city of Cincinnati, in the county of Hamilton and State of Ohio, have invented a certain new and useful Combination of Electric Motors and Induction-Coils for the Application of Electricity for Medical Purposes and in the Apparatus of and for Induction-Coils, of which the following is a specification.

In the accompanying drawings making a part of this specification, and to which reference in hereby made,—Figure 1 is a view of a motor, a circuit breaking device of my invention and an induction coil, also embodying certain features of my invention, and a battery conventionally indicated. This view is a diagrammatic one, as regards the disposition of the wires forming the electrical circuits, and it shows in general outline, one mode of winding the field magnets, and the induction coil, and indicates one mode of making electrical connections between the different portions of the apparatus. Fig. 2 is a side elevation of the circuit breaker, illustrating its mode of closing and breaking the circuit. Fig. 3 is a view of an induction coil embodying certain features of my invention. For purposes of illustrating the construction of this coil, the right hand end is shown in elevation, certain of the exterior layers of wire having been removed to disclose the lower ones, and all of the coils or layers of wire having been removed from the left hand end portion, and the said latter portion being shown in vertical, longitudinal section to disclose the inner hollow cylinder or shell around which the wires of the coil are wound. Fig. 4 is a central, transverse vertical section of the induction coil. Fig. 5 is a vertical, longitudinal section of the adjustable core of the induction coil. Fig. 6 is a central, vertical, transverse section of this adjustable core. Fig. 7 is a vertical, longitudinal section of the eye for receiving the elastic plug at the end of the wire connected to one of the handles, and thereby making connection therewith, the plug being shown in elevation. Fig. 8 is a side elevation of the magnets and armature. This view shows another mode of coupling the conducting wires.

The platform A, which supports the mechanism (except the battery) hereinafter specified, is of any suitable shape.

B is a rotatable armature, located between two field magnets C. The cores $C'$, $C'$, of these magnets are presented to the armature, and the longitudinal axes of the cores are preferably coincident with one another. The cores of the magnets should be connected by a metallic connection. The particular shape or location of this connection is not material to the invention herein specified.

A convenient mode of connecting the cores of the magnets is shown in Figs. 1 and 8. In these figures, each core $C'$ is supported by a metallic post $C^2$. An oval or ring shaped basal piece $C^3$ consisting of two limbs or halves $C^4$, $C^4$, is at one end united to one of the posts $C^2$, and at the other end united to the other post $C^2$. Each core $C'$ is preferably made integral with its supporting post and the basal piece $C^3$ is likewise preferably integral with the supporting posts $C^2$ $C^2$.

The preferred description of armature is one composed of sectors of a circle, each sector performing the function of an armature. The number of these sectors may be varied. Where two magnets are employed, as in the present illustrative instance, the number of sectors employed will be an even one. In the smaller descriptions of motors, four sectors are a very desirable number. Each of the sectors $E'$, $E^2$, $E^3$ and $E^4$ is mounted on a spoke $D^4$ radial to the axial shaft D. Each of these radial spokes $D^4$ is rigidly attached to the hub $E^6$, located around and suitably fixed to a shaft, as D. In view of the electrical functions performed by each of these sectors, they will hereinafter, for the sake of correctness of electrical nomenclature, be termed "pole-pieces." Each of the sectors $E'$, $E^2$, $E^3$ and $E^4$ of the armature is preferably made long in comparison to the length of the space between adjacent sectors, in order to perform more effective services in imparting a forcible rotation to the shaft D. Each of these sectors, in the present illustrative instance, is about one-sixth of a circle in length, the spaces between the adjacent armatures being one-twelfth of a circle long. Thus, these four sectors and the four spaces respectively intervening between them, make up the sum of a complete circle. The shaft D is journaled in bearings P' in the bearing posts P and is prevented from slipping longitudinally by means of any suitable devices. In the present instance, the hub $E^6$ is connected to a sleeve D', and the latter surrounds and closely fits the shaft D. A set screw $D^2$ screwed through hub $E^6$ and sleeve D' and against or into shaft D, rigidly secures these parts together. One end of the sleeve D' bears against the inner side of one journal bearing P' in one post P, and the other end of the sleeve D' bears against the inner side of the other journal bearing P' of the other post P. In this way, the shaft is kept in a longitudinally correct position.

The commutating mechanism is as follows:—The part M is an angular form. The rotation of the shaft D causes the rotation of the part M. This rotation is accomplished in any desired and suitable manner. The preferred mode is the one shown, and consists in mounting the part M on the shaft D, either between the journal bearings or on an extension of the shaft outside of the adjacent bearing P' as shown. In either case, the part M and the shaft D will be concentric. Where the armature consists of four sectors or pole pieces, this part M will also have four angular points M', each of which successively in turn will come into contact with the brush. This brush S comes into contact successively with the angular points of the part M as the latter is revolved. The brush after being pushed back by an angular point M' of the part M, is returned to its first position in readiness to meet the next point of part M, preferably by means of spring pressure. In the present instance, the spring pressure is evolved from the brush itself, the latter being made of elastic material, and continually pressing forward against points of the part M when the latter has impinged against and pushed back said brush S. Instead of the electrical conducting wire being connected to it, it will be connected to the post S', preferably to the base of the latter. In the upper end of this post S' is a contact S, whose forward end is placed near to the brush S. This contact is preferably provided with a means for determining and regulating the distance between it and the brush S. The preferred means for such adjustment are shown and consist of the screw thread on the shank of the contact $S^2$, engaging an interior screw threaded opening in the post S', thus enabling the said contact $S^2$ to be adjusted nearer to or farther from the brush S, in order to produce such electrical closing and breaking of the circuit as the part M rotates, as shall operate to the most rapid and forceful revolution of the armature and its power shaft D.

The power derived from the armature shaft D is communicated in any suitable manner to other mechanism which it is to operate. In the present illustrative instance, a pulley R' affords means for the attachment of a belt or belts. As a pole piece of the armature approaches the field magnet, a point of the part M pushes the brush S back against the point of the contact $S^2$, as shown in Fig. 2. When the point of part M has ceased operating upon the end of the brush, the latter by means of said spring, leaves the contact $S^2$, and interrupts the circuit.

The induction coil constructed according to my invention, is as follows:—K indicates a hollow cylinder, made of paste or straw board. This cylinder is a non-conductor, is light and strong, and affords a good and serviceable foundation for the coils. The cylinder is supported by suitable supports, as K', K', which preferably extend out on each side of the coil beyond its periphery and constitute end guards for preventing the coils from slipping off the ends of the cylinder K. One end of the cylinder K is open and accessible as shown, to admit the core to be introduced therein. Upon this cylinder K are wound the coils, in any of the usual and well known modes. One mode is as follows:—Next to the cylinder, the primary wire $X^{10}$ is coiled around the cylinder from end to end of the latter, to the thickness of at least three layers of wire. Each strand of this wire is suitably insulated from the adjacent strands. One end of the wire SX' for the secondary circuit is connected to a wire of the outer coil of the primary circuit wire $X^{10}$ at N. The secondary circuit wire is coiled around coils of the primary circuit wire in a number of layers. Preferably, at least six of these layers of the secondary circuit wire are present. The free end of this wire SX' of the secondary circuit is then brought and arranged to connect with and form a part of the wire $SX^5$ connecting the former wire with one of the handles to be grasped by the person receiving a medical application. One portion $X^{11}$ of the primary circuit wire, after it leaves the point N where the secondary wire is attached to it, passes from the induction coil toward the battery, with which latter it is sooner or later connected. On its way to the battery, it is connected by a suitable means to the wire $SX^4$, connected in turn to the other handle H to be held in the other hand of the person receiving the electric current or shock.

The preferred means of connecting the secondary wire SX' and the wire $SX^5$ together on the one hand, and of connecting the wire $X^{11}$ and $SX^4$ on the other, are of my invention and will now be described. In the platform A are located the sleeves W. A horizontal flange W' at the top of the sleeve, rests upon the top surface of the platform and prevents the latter from slipping through the platform. The space within the sleeve preferably tapers slightly smaller from top to bottom. To one of these sleeves W, viz: at $SX^3$, is connected the primary circuit wire $X^{11}$, and to the other sleeve viz: at $SX^2$, the secondary current wire SX' is connected. On that end of the wire $SX^4$ which is to be connected to the wire $X^{11}$ is an elastic plug $W^2$, formed of a coil of bare spring wire, tapering toward its free end. This elastic plug is at its smaller end of less diameter than that of the mouth or upper end of the interior space of the sleeve W, and at its larger end is preferably of larger diameter than the upper end of the interior space of said sleeve. The spring plug may be made without a taper, and so may the sleeve, which is to receive it. In such event, the spring plug will be made of an exterior diameter slightly larger than the diameter of the space within the sleeve and the spring plug will be crowded, being pressed into the sleeve, and will by its elasticity make proper contact between itself and the adjacent interior surface of the plug. But I prefer to make either the plug or the sleeve, or both of them, of a tapering form, so that I can employ the principle of the wedge in connection with the elastic plug, and in this way, I am enabled to more readily insert the plug into the sleeve, and also cause it to press more forcibly against the interior surface of the sleeve. Furthermore, as the elastic plug at its point of junction with the sleeve shall become somewhat smaller than it was originally, that portion of the plug which is still larger than its diameter may be utilized in making the electrical contact. By inserting, under a slight pressure of the fingers, this elastic plug $W^2$ into the sleeve W, immediate and sure electrical connection is made with the sleeve W at $SX^3$, and consequently with wire $X^{11}$, for the reason that the expanding elasticity of the plug causes it to press hard against the metal of the sleeve and also causes it to resist being withdrawn from the sleeve by any ordinary pull upon it, transmitted to it through the wire $SX^4$ and its handle, from the person receiving the shock. This plug can, however, be quickly withdrawn from the sleeve by a strong and direct upward pull, and the handles and its accompanying wire $SX^4$ placed safely away, when the induction coil is not needed for use. To that end of the wire $SX^5$ which is to be connected to the wire $SX'$ is connected an elastic plug $W^2$, made like the former one and of the same size relatively to the sleeve W at $SX^2$, as the aforenamed plug $W^2$ is to the sleeve W it enters at $SX^3$. Connection between the wire $SX^5$ and sleeve at $SX^2$ is readily and quickly made by forcing the plug $W^2$ at the terminus of wire $SX^5$ into the sleeve, and the circuit through the sleeve and wire is broken at $SX^2$, by the withdrawal of the plug. These means for connecting the wires $SX^5$ and $SX^4$ to the respective wires $SX'$ and $X^{11}$ are convenient, cheap, easily operated, and are always present.

The core T of the induction coil is adjustable. Its construction, which is a feature of my invention, is as follows:—The tin, known as taggers' tin, which consists of thin sheet iron coated on both sides with a thin superficial layer of tin, is cut in a strip. The width of this strip is the length of the core. The strip is rolled up, thereby forming externally a cylinder of a diameter slightly smaller than the diameter of the cylindrical space within the sheath or hollow cylinder K of the induction coil. The center of this cylinder wound or coiled upon itself is hollow. Into one end of this tin cylinder is driven a nail whose shank $T^2$ is of metal (iron preferred), and fills the central portion of the cylinder, thereby rendering the core more magnetic and better adapted to increase the capacity of the coil for imparting greater elastic energy to the circuit through the wires $SX^4$ and $SX^5$ and the person holding the same. The head $T^3$ of the nail preferably projects laterally beyond the periphery of the core T, and thus prevents the core T from being pushed too far into the cylinder, and also affords a convenient hold for the fingers in moving the core into or out from the cylindrical sheath K.

I will now describe the preferred arrangement of wires for the circuits. L represents a battery, conventionally shown. To one pole thereof is attached one end of a wire X, the other end of this wire X being connected to the basal end of the brush S. The end of another wire $X'$ is connected to the post $S'$, preferably at its lower portion. The end of this wire $X'$ is at $Z'$ connected to one end of the wire $X^2$, and to the end of the wire $X^6$. Wire $X^2$ connects with the left hand end of the coil $X^3$ of the left hand field magnet. The other end of the coil $X^3$ is connected to the adjacent end of the wire $X^4$, and the other end of the last named wire is connected at Y to the right hand end of the coil $X^5$ of the right hand field magnet. The other, or left hand end of the coil $X^5$ of said magnet is connected at Z to the other end of wire $X^6$ than that which is attached to wire $X'$. At the point Y, viz: at the junction of the wire $X^4$ and the wire $X^5$ of the magnet, is connected one end of a wire $X^7$, the other end of which is connected to the primary wire $X^{10}$ of the induction coil. For the purpose of cutting off the electric current from the induction coil when the latter is not in use, I provide a switch $X^9$, pivoted at $Z^3$. To this contact $Z^3$ that end of the wire $X^7$ which would otherwise be connected to the wire $X^{10}$ is attached. The pivotal end of the metal switch $X^9$ is connected to the adjacent end of the primary wire $X^{10}$ of the induction coil. The other end portion of this primary coil, viz: portion $X^{11}$, is connected to one end of the wire $X^{13}$. The other end of this last named wire $X^{13}$ is connected to that pole of the battery which is opposite the one to which wire X is connected. For the purpose of making the switch $X^9$ operative, I place a contact $Z^5$ at the junction of the wire $X^{11}$ with the wire $X^{13}$.

The operation of the apparatus will now be briefly described. The electrical current passes from the positive pole of the battery through the circuit to the negative pole of the battery in the well known manner. When the switch $X^9$ is turned, as shown in the drawings, the electrical current will pass through the induction coil. The electrical current starts the motor in motion, viz: causes the armature B to revolve. The circuit breaker operated by the armature is also set in operation. The result of the action of the circuit breaker is to make the electrical current passing through the induction coil an interrupted current. This interrupted current creates a secondary or induction current through the secondary circuit, and the person holding the handles H, H, receives this current in the usual manner. Thus it will be seen that the action of the motor is utilized as a motor to generate and transmit power to machinery, and also to become a circuit breaker, and thus the maker of an interrupted current producing a secondary current in the induction coil.

As hereinbefore suggested, other modes of coupling the conducting wire of the motor, in preparation for the connection of the electrical circuit of the latter with the induction coil may be employed. The mode of coupling the wires as shown in Fig. 1 is that known as coupling in multiple series, or series multiple. Another mode of coupling, viz: in "series," is shown in Fig. 8. Still another mode of coupling, viz: the well known "shunt" coupling, may be employed. Specific varieties of winding or coupling the wires under any of these generic divisions of coupling may be employed.

While the various features of my invention are preferably employed together, one or more of the said features may be employed without the remainder, and in so far as applicable, one or more of the said features may be employed in induction coils other than the specific coil herein described. So also the following feature of my invention, viz: the induction coil, and a motor and circuit breaker operated by said motor, and in turn operating the latter, may be varied as to the form of motor, description of circuit breaker, and style of induction coil without detracting from the general features of my invention.

What I claim as new and of my invention, and desire to secure by Letters Patent, is—

1. A contact, such as $SX^2$, $SX^3$, consisting of the sleeve W, and the elastic tapering plug $W^2$ formed of a coil of wire, connected to another wire of the circuit, the sleeve W receiving the said elastic plug $W^2$ when the circuit is to be closed, substantially as and for the purposes specified.

2. A contact, such as $SX^2$, $SX^3$, consisting of the sleeve W, provided with flange $W'$, and the elastic tapering plug $W^2$ formed of a coil of wire, connected to another wire of the circuit, the sleeve W receiving the said elastic plug $W^2$ when the circuit is to be closed, substantially as and for the purposes specified.

3. For induction coils, as a new article of manufacture an adjustable core consisting of a sheet of tinned iron coiled in the form of a cylinder, and a nail consisting of the shank $T^2$ driven into the center of the said coiled tin, and provided with a head as $T^3$, whose edges extend beyond the periphery of the said cylinder T, substantially as and for the purposes specified.

4. In combination with a motor, the induction coil, having a sheet of tinned iron coiled in the form of a cylinder, and a nail consisting of the shank $T^2$ driven into the center of the said coiled tin, and provided with a head as $T^3$, whose edges extend beyond the periphery of the said cylinder T, substantially as and for the purposes specified.

5. The combination of the motor, circuit breaker operated thereby, and the induction coil, having a sheet of tinned iron coiled in the form of a cylinder, and a nail consisting of the shank $T^2$ driven into the center of the said coiled tin, and provided with a head as $T^3$, whose edges extend beyond the periphery of the said cylinder T, substantially as and for the purposes specified.

JOHN S. NOWOTNY.

Attest:
WM. HARTLEY PUGH,
K. SMITH.